(12) United States Patent
Hanchi et al.

(10) Patent No.: US 7,564,649 B2
(45) Date of Patent: Jul. 21, 2009

(54) HEAD ASSEMBLY HAVING A SENSING ELEMENT TO PROVIDE FEEDBACK FOR HEAD-MEDIA INSTABILITY

(75) Inventors: Jorge Vicente Hanchi, St. Louis Park, MN (US); Dian Song, Eden Prairie, MN (US); John Stuart Wright, Bloomington, MN (US); Andrew D. White, Brooklyn Park, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 379 days.

(21) Appl. No.: 11/115,659

(22) Filed: Apr. 27, 2005

(65) Prior Publication Data

US 2006/0245110 A1   Nov. 2, 2006

(51) Int. Cl.
*G11B 5/56* (2006.01)
*G11B 21/02* (2006.01)
*G11B 5/60* (2006.01)

(52) U.S. Cl. .............. 360/234.7; 360/294.3; 360/294.7; 360/75

(58) Field of Classification Search .................... 360/75, 360/294.3, 294.4, 234.7, 294.7
See application file for complete search history.

(56) References Cited

U.S. PATENT DOCUMENTS

| 5,488,857 | A | 2/1996 | Homma et al. ................. 73/105 |
| 5,942,680 | A | 8/1999 | Boutaghou .................... 73/105 |
| 6,008,640 | A * | 12/1999 | Tan et al. ..................... 324/212 |
| 6,196,062 | B1 | 3/2001 | Wright et al. ................. 73/105 |
| 6,557,399 | B1 | 5/2003 | Ku et al. ....................... 73/105 |
| 6,600,619 | B1 | 7/2003 | Morris et al. ................. 360/75 |
| 6,611,399 | B1 | 8/2003 | Mei et al. ................. 360/234.7 |
| 6,614,627 | B1 | 9/2003 | Shimizu et al. .......... 360/294.4 |
| 6,757,140 | B1 | 6/2004 | Hawwa .................... 360/294.5 |
| 6,760,181 | B2 | 7/2004 | Li et al. ........................ 360/75 |
| 7,209,309 | B2 * | 4/2007 | Kurita et al. .................. 360/75 |
| 2002/0040594 | A1 * | 4/2002 | Matsui et al. ................. 73/104 |
| 2002/0054447 | A1 * | 5/2002 | Kurita et al. .................. 360/75 |
| 2002/0105750 | A1 | 8/2002 | Li et al. ........................ 360/75 |
| 2002/0191342 | A1 * | 12/2002 | Yanagisawa ............. 360/236.5 |

(Continued)

FOREIGN PATENT DOCUMENTS

EP          739007 A2 *  10/1996

(Continued)

OTHER PUBLICATIONS

U.S. Appl. No. 10/385,579, filed Mar. 11, 2003, entitled *In-Situ Monitoring of Proximity and Contact Between a Slider and a Disc in a Disc Drive*, Jorge V. Hanchi et al.

*Primary Examiner*—William J Klimowicz
(74) *Attorney, Agent, or Firm*—Westman, Champlin & Kelly, P.A.

(57) ABSTRACT

A head assembly having a sensor element on the head assembly. Embodiments of the sensor element are configured to detect non-contact induced head-media interface instability, "onset of contact" or low level interference. The non-contact head-media instability or interference is detected based upon sensor feedback relating to excitation of the air bearing resonance modes of the slider body. In embodiments of the present invention, the sensor head assembly includes a microactuator which is energizable to microactuate the head or transducer elements on the head assembly.

17 Claims, 13 Drawing Sheets

U.S. PATENT DOCUMENTS

| | | | |
|---|---|---|---|
| 2003/0011914 A1 | 1/2003 | Angelo et al. | 360/25 |
| 2003/0043491 A1* | 3/2003 | Riddering et al. | 360/69 |
| 2003/0043497 A1* | 3/2003 | Riddering et al. | 360/75 |
| 2004/0233583 A1* | 11/2004 | Yanagisawa | 360/294.7 |
| 2004/0240099 A1* | 12/2004 | Brannon et al. | 360/75 |
| 2005/0013057 A1* | 1/2005 | Kurita et al. | 360/294.7 |
| 2005/0243473 A1* | 11/2005 | Hu et al. | 360/294.3 |
| 2005/0264912 A1* | 12/2005 | Nikitin et al. | 360/75 |
| 2006/0098346 A1* | 5/2006 | Kwon et al. | 360/294.3 |
| 2006/0146432 A1* | 7/2006 | Khurshudov et al. | 360/31 |

FOREIGN PATENT DOCUMENTS

| | | | | |
|---|---|---|---|---|
| JP | 01091384 A | * | 4/1989 |
| JP | 01171172 A | * | 7/1989 |
| JP | 02226047 A | * | 9/1990 |
| JP | 03040277 A | * | 2/1991 |
| JP | 03173981 A | * | 7/1991 |
| JP | 03214480 A | * | 9/1991 |
| JP | 04176066 A | * | 6/1992 |
| JP | 04221401 A | * | 8/1992 |
| JP | 07296379 A | * | 11/1995 |
| JP | 09007148 A | * | 1/1997 |
| JP | 09044979 A | * | 2/1997 |
| JP | 10027342 A | * | 1/1998 |
| JP | 10027415 A | * | 1/1998 |
| JP | 11339414 A | * | 12/1999 |
| JP | 2002150735 A | * | 5/2002 |
| JP | 2002197646 A | * | 7/2002 |
| JP | 2003123204 A | * | 4/2003 |
| JP | 2003297029 A | * | 10/2003 |

* cited by examiner

HEAD ASSEMBLY HAVING A SENSING ELEMENT TO PROVIDE FEEDBACK FOR HEAD-MEDIA INSTABILITY

FIELD OF THE INVENTION

The present invention relates generally to data storage devices, and more particularly but not by limitation to a head including a sensor having application for a data storage device.

BACKGROUND OF THE INVENTION

Data storage devices store digitally encoded information on a data storage medium, such as a disc. A head is used to read and/or write information to the disc or storage medium. The head includes a transducer element, such as a writer and/or reader which is fabricated on or coupled to a slider body to read and/or write information to the disc.

Typically, the head flies over the disc surface via pressurization of an air bearing surface or surfaces of the slider body. In particular, during operation, rotation of the disc creates an airflow along air bearing surfaces of the slider so that the slider floats above the disc surface for read or write operations. The head is positioned relative to data tracks on the disc surface via a head actuator. The head is coupled to the actuator via a suspension assembly. The suspension assembly includes a load beam which supplies a load force to the slider body which counteracts the lifting force of the air-bearing surface to provide a fly height of the slider body relative to the disc surface.

Manufacturing processes and tolerances introduce a waviness or asperities to the disc surface. Disc waviness or variations can introduce pressure disturbances or gradients along the air-bearing surface. Typically, air-bearing surfaces compensate for different pressure gradients to provide a relatively stable fly height for the slider body or head. As form factor size decreases and drive storage density increases, fly heights for the data heads relative to the disc surface are decreasing. With the lower fly heights, it is more difficult for the air bearing surface to compensate for disc waviness or other topographical irregularities to prevent non-contact or contact-induced head-media spacing instabilities detrimental to disc drive performance.

Sensors, for example glide head sensors, are used to provide feedback of head-disc contact or interference. Prior sensors detect or monitor excitation of slider structural modes. Excitation of the slider structural modes typically requires high levels of interference between the head and the disc. As flying heights are reduced to enable increasing drive storage densities, non-contact instabilities or low level interference become more significant. The present invention provides solutions to these and other problems, and offer other advantages over the prior art.

SUMMARY OF THE INVENTION

The present invention relates to a head assembly having a sensor element on the head assembly. Embodiments of the sensor detect excitation of air bearing resonance modes of the slider body to monitor non-contact induced head-media interface instability, "onset" of contact or contact. The head-media instability is detected based upon sensor feedback relating to air bearing resonance modes of the slider body. In embodiments of the present invention, the sensor head assembly includes a microactuator which is energizable to microactuate the head or transducer elements on the head assembly. Other features and benefits that characterize embodiments of the present invention will be apparent upon reading the following detailed description and review of the associated drawings.

BRIEF DESCRIPTION OF THE DRAWINGS

FIG. 2-1 is a cross-sectional view taken along line 2-1-2-1 of FIG. 2.

FIG. 3-1 is a schematic illustration of a head over a track having a sector of micro-waviness which excites air bearing resonance modes.

FIG. 4-1 illustrates sensor feedback in a 100-400 kHz frequency range having a micro-waviness instability excitation.

FIG. 4-2 illustrates sensor feedback in the 100-400 kHz frequency range excited by contact.

FIG. 7-1 is an enlarged or detailed view of portion 7-1 of FIG. 7.

FIG. 9-1 illustrates an embodiment where the piezoelectric element(s) or sensing element(s) of FIG. 9 are coupled to detection circuitry and microactuation circuitry.

DETAILED DESCRIPTION OF ILLUSTRATIVE EMBODIMENTS

Figure 1:
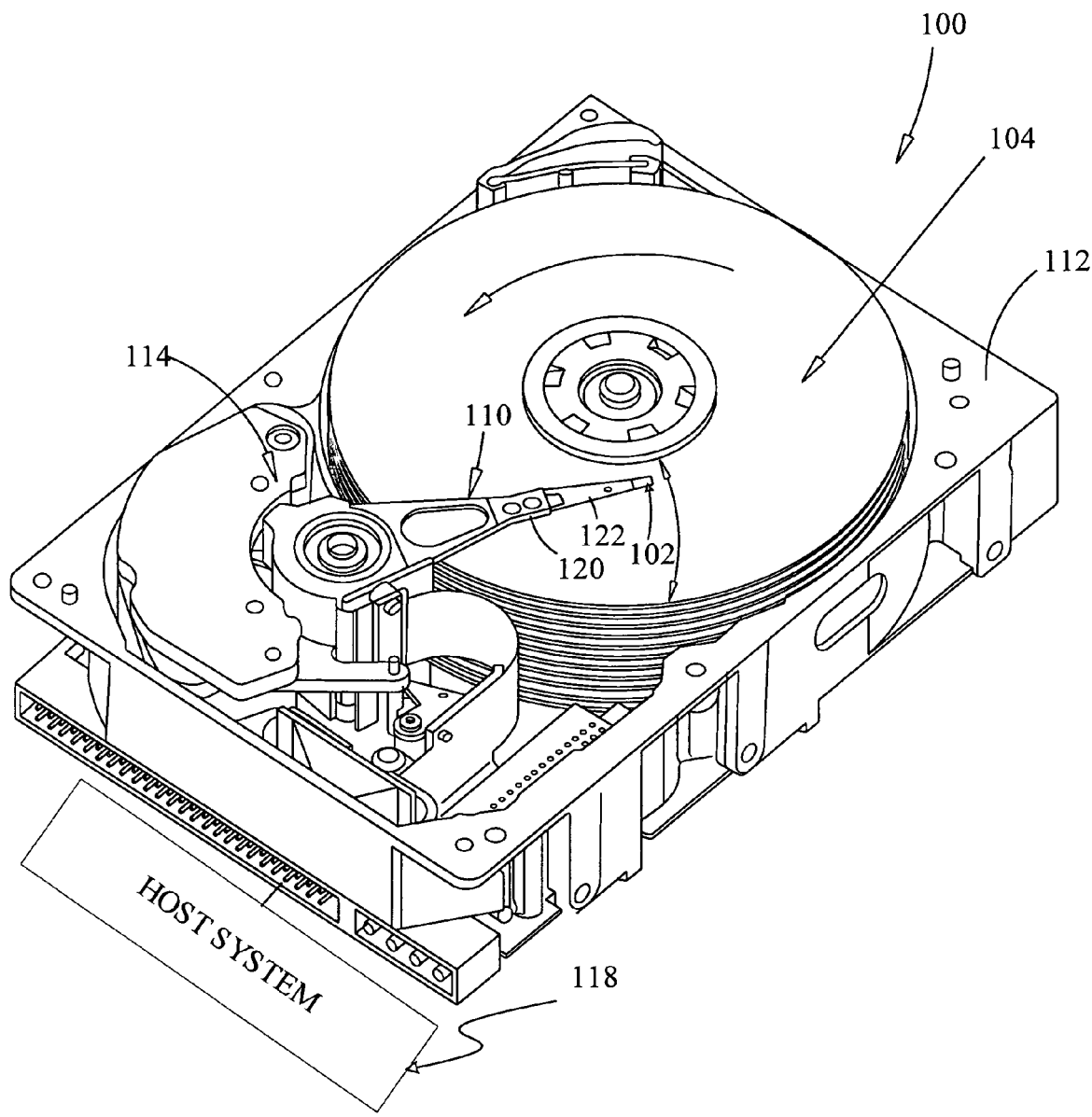
FIG. 1 is a perspective view of an embodiment of a data storage device for which the present application can be used.

FIG. 1 is a perspective illustration of an embodiment of a data storage device 100 in which the present invention can be used. As shown in FIG. 1, a cover (not shown) of the data storage device 100 is removed to illustrate components of the device. The device includes heads 102 which read and/or write data to a disc or data storage medium 104. In the embodiment shown, the data storage device 100 includes a plurality of heads 102 and a plurality of discs 104 or disc pack although application is not so limited, for example, the data storage device can include a single disc.

Heads 102 are coupled to an actuator assembly to position the heads 102 relative to data tracks on the disc surface. In the illustrated embodiment, the actuator assembly includes an actuator block 110 rotationally coupled to a base chassis 112 of the device. The actuator block 110 is rotated via a voice coil motor (VCM) 114 to move the heads along an arcuate path between an inner diameter and an outer diameter of the disc or discs 104. Voice coil motor 114 is driven by servo electronics based on signals generated by the head(s) 102 and a host computer or system 118 as schematically shown.

The actuator block 110 of the actuator assembly includes arms 120. Heads 102 are coupled to arms 120 of the actuator block 110 via a head suspension assembly 122. The head suspension assembly 122 includes a load beam which supplies a load force to the head at a load point. The head is coupled to the load beam or suspension assembly through a gimbal spring (not shown in FIG. 1) to allow the head to pitch and roll relative to the load point to follow the topography of the disc surface.

Figure 2:
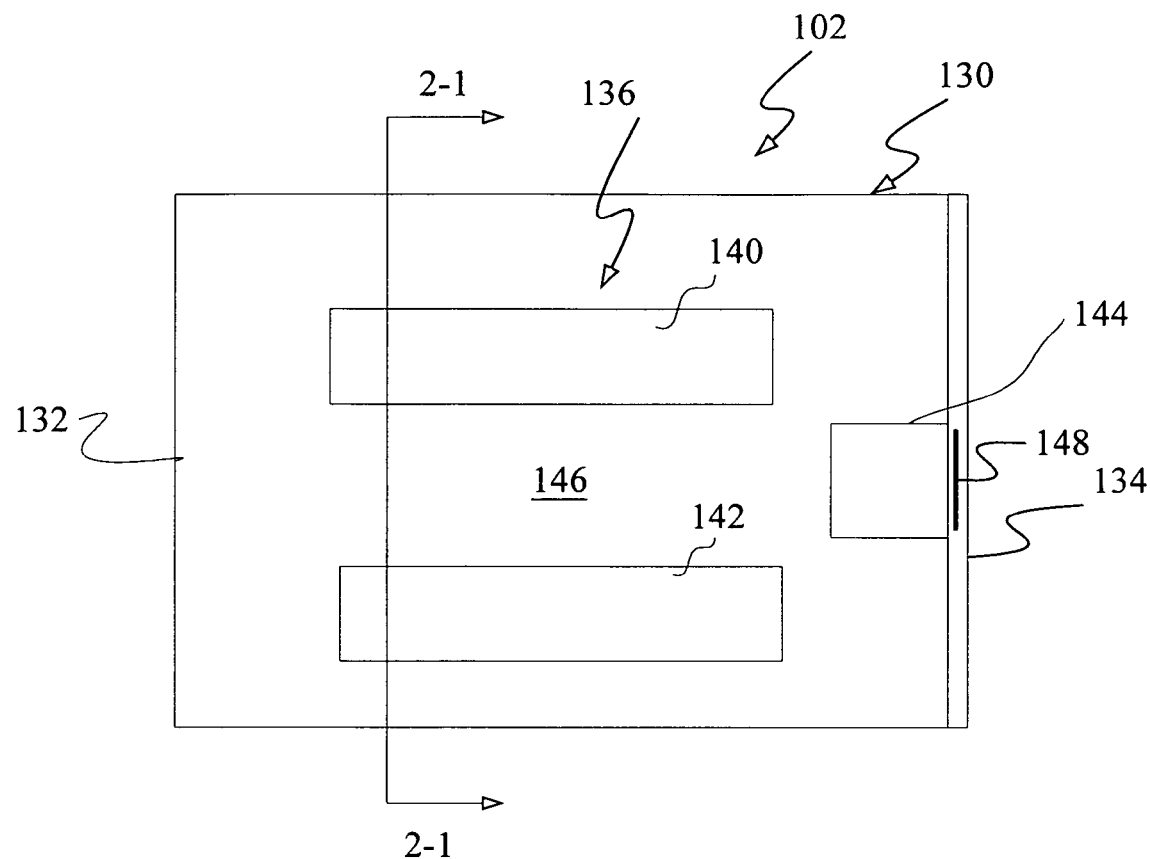
FIG. 2 illustrates a head or slider including an air-bearing surface.
Figures 1, 2:
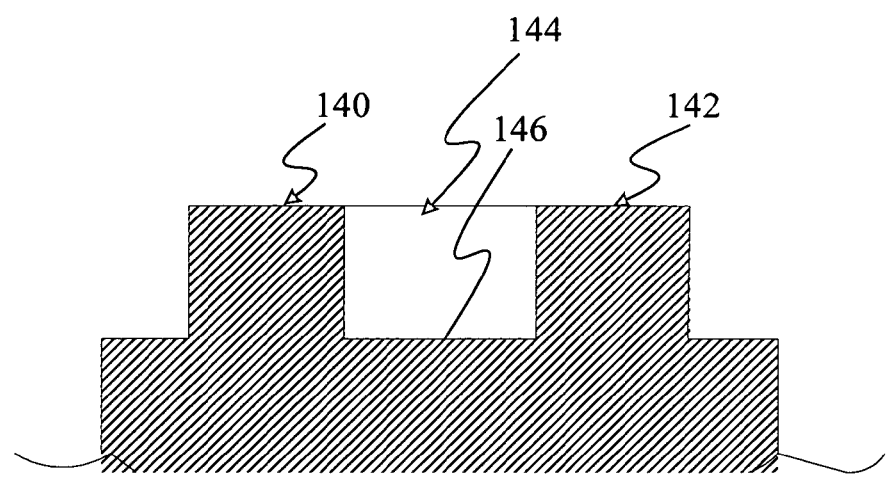

As shown in FIG. 2, the head 102 includes a slider body 130 having a leading edge 132 and a trailing edge 134. An air bearing surface 136 including a raised bearing surface and a recessed bearing surface is fabricated on the slider body 130. In the embodiment illustrated in FIGS. 2 and 2-1, the air bearing surface includes raised rails. 140, 142 and a center raised pad 144 elevated above recessed bearing surface 146, although application is not limited to the specific air bearing surface shown. For example, the air bearing surface can include opposed side rails or other designs. Transducer element or elements 148 are fabricated proximate to the trailing edge 134 of the slider body to read or write data to the disc surface.

Figures 1, 3:
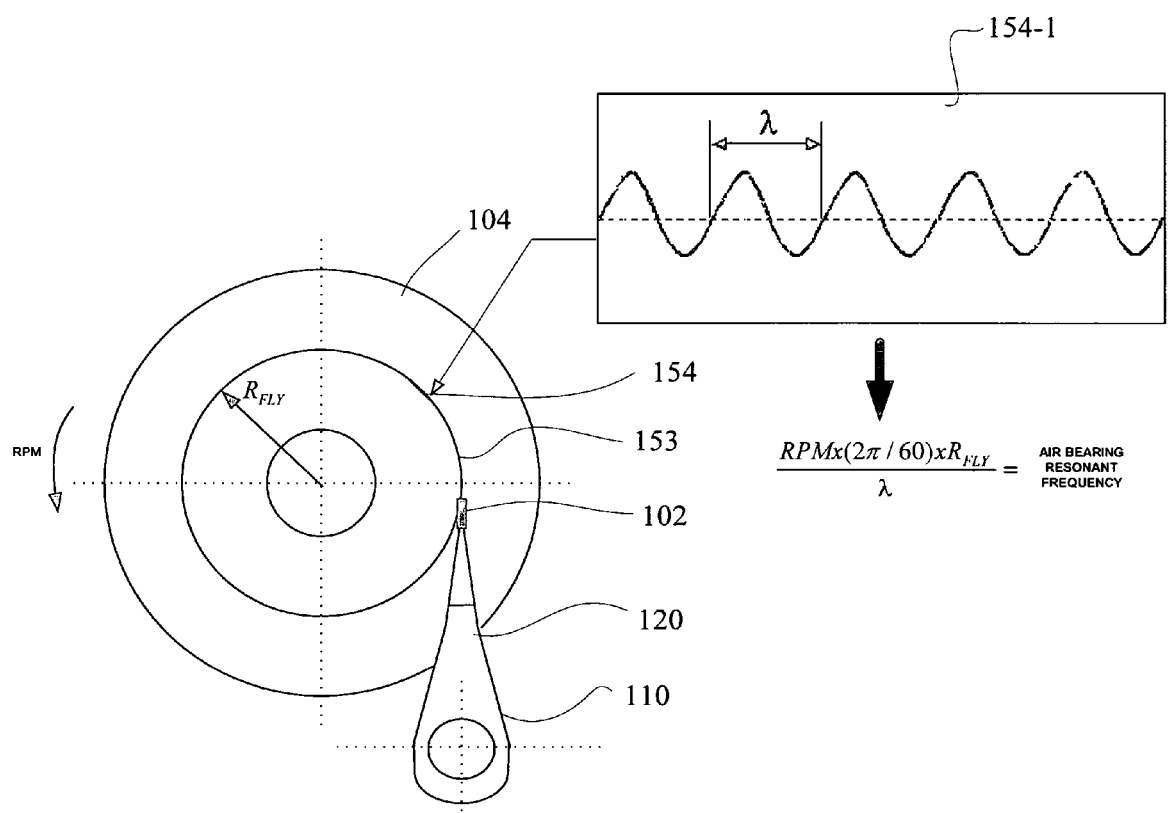
FIG. 3 schematically illustrates a head media interface and head-media spacing.
Figure 3:
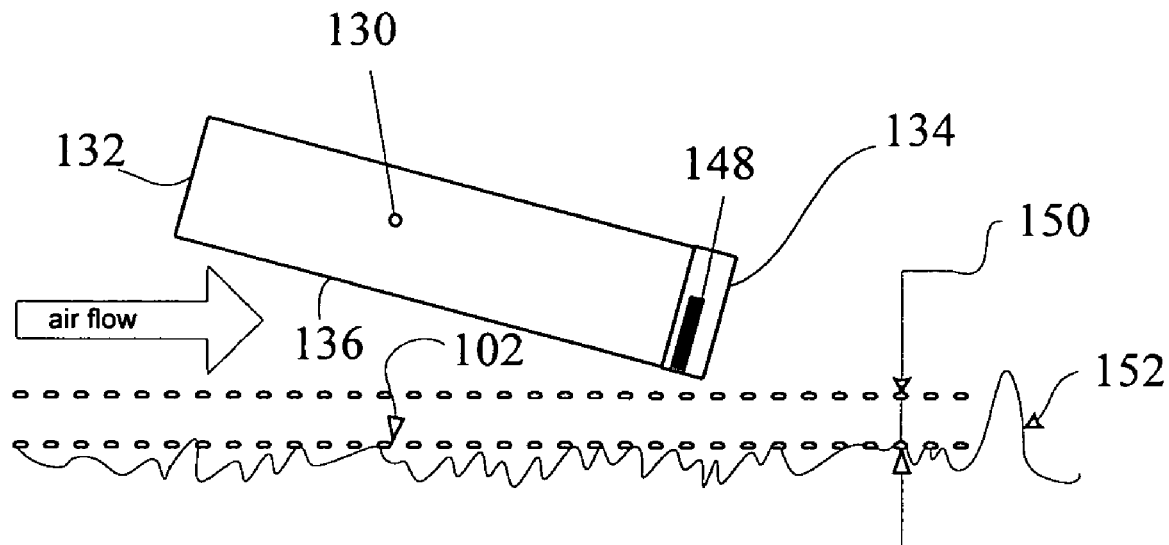

As shown in FIG. 3, rotation of the disc creates an airflow along a disc surface to pressurize the air bearing surface 136 so that the slider "flies" over the disc surface for operation. Air flows from the leading edge 132 of the slider body 130 toward the trailing edge 134 of the slider body to pressurize the air bearing surface of the slider body 130. The slider or head is typically supported at a pitch angle so that a trailing edge 134 of the slider or head flies closer to the disc surface than the leading edge 132 to position the transducer elements 148 proximate to the disc surface for read or write operations. The distance between the transducer elements 148 and the disc surface is referred to as head-media spacing 150 as shown in FIG. 3. Variations in the head media spacing 150 affects read-write resolution and clarity.

As illustrated in FIG. 3, the disc surface is not perfectly smooth and can include asperities 152 or disc waviness. During operation, the head can contact asperities (e.g. asperity 152) on the disc surface. Contact between the head and the disc surface can damage the head and create an unstable head-media interface. For example, as illustrated in FIG. 3-1, a track 153 as shown includes a microwaviness sector 154 as illustrated in exploded block 154-1.

Typically, prior to use, a glide head is used to map asperities on the disc surface at the drive level or on a dedicated spin-stand as is known in the art. In particular, contact with an asperity (e.g. asperity 152) excites vibration modes of the glide body or head (e.g. structural modes of the slider or head). A sensor on the glide body detects contact or high level interference via excitation of the structural modes of the glide body to map asperities on the disc surface. The asperities 152 are mapped to avoid reading data to bad disc sectors. Based upon the disc scanning process, defective discs are rejected to avoid assembling a defective disc or media in a production drive or device.

Typically, the air bearing surface can accommodate for disc waviness to provide a relatively stable fly height or head-media interface for desired read and/or write resolution. However, as form factor size decreases and drive storage density increases, head-media spacing parameters are decreasing and it is more difficult for the air bearing surface to compensate for disc waviness and provide a stable fly-height or head-media interface.

In particular, in a proximity, or near-contact regime of operation, the head-media spacing parameters are in the 10 nm range or below. In these regimes, unstable head-media interface behavior can occur in the absence of physical head-disc contact. An example of such behavior would be air bearing instabilities (leading to transient flyheight modulation) driven by intermolecular (van der Waals) adhesive forces and/or transient meniscus formation (as the lubricant present on the surface of the recording media bridges the head-media spacing or interface). Such air bearing instabilities detrimentally impact data writing and/or readback performance. Another example of a non-contact-induced instability would be tribocharging-driven electrostatic discharge across the head-disc interface which could lead to data loss, head degradation, or both. Sensors which detect contact interference are not sensitive to non-contact induced instability or onset of contact.

Additionally, head-disc interaction at the "onset of contact" or under full (heavy interference) contact conditions can detrimentally impact head-disc interface integrity. In the head-disc interface context, "onset of contact" is a "low-energy" physical interaction between a head and disc where the (real) area of contact is very small either because the contact is very localized (e.g., the contact of a protruded R/W pole with the disc in the case of a head disc interface in which a recording head having a pole tip actuation device, such as a heater element for head media spacing control is used), or because contact is defined by the interaction of the tallest asperities present on both head and disc surfaces—a very low level of interference contact. Prior sensors which detect excitation of slider structure modes are not particularly sensitive to low level interference.

Figure 4:
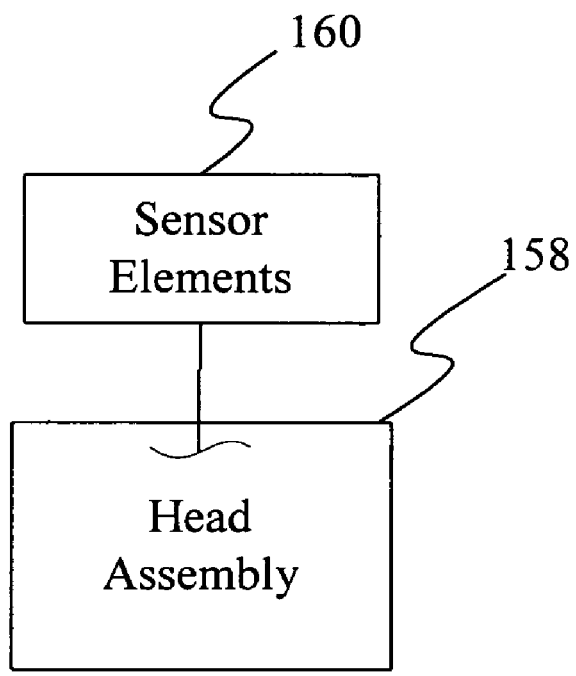
FIG. 4 is a block diagram of an embodiment of the present invention illustrating a head assembly including a sensor.
Figures 1, 4:
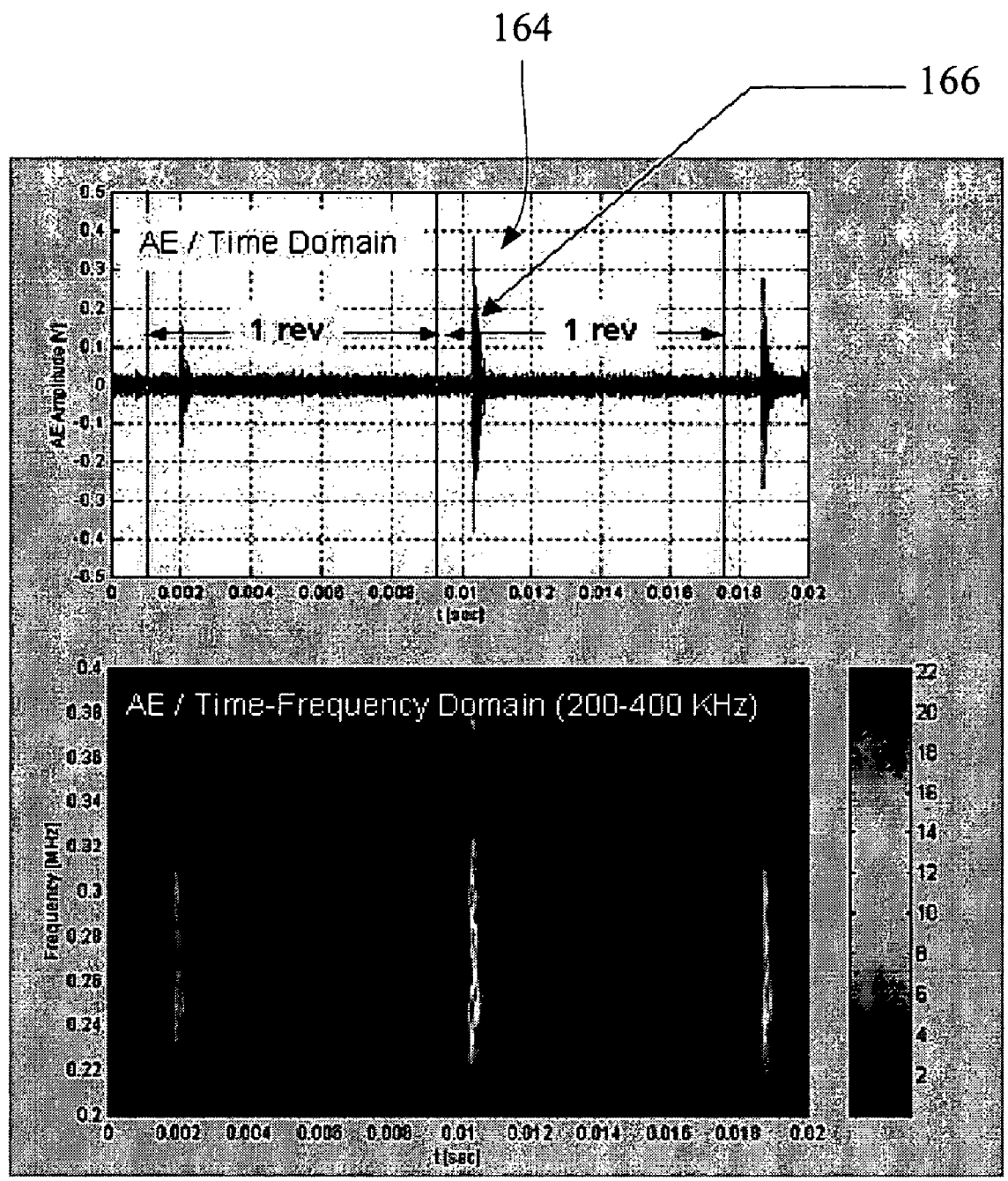
Figures 2, 4:
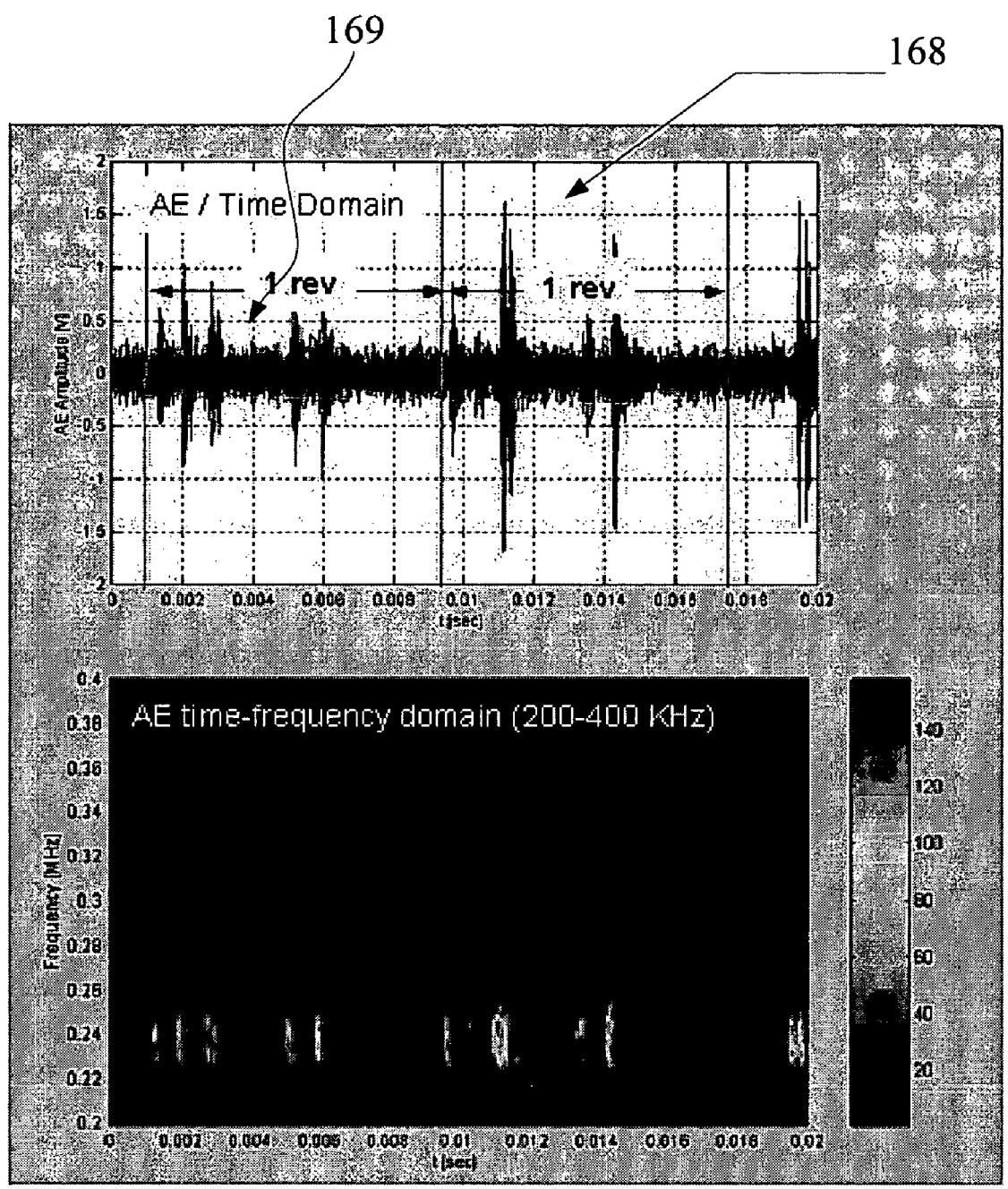

FIG. 4 schematically illustrates a head assembly 158 which has application for the present invention to detect low level interference or non-contact instabilities. The head assembly is coupled to the suspension assembly 122 and as schematically shown in FIG. 4, the head assembly 158 includes a sensor element 160 which provides feedback corresponding to excitation of air bearing resonance modes.

In embodiments described, the sensor element 160 detects "non-contact induced instabilities", "onset" of contact and contact by monitoring air bearing resonance modes of the slider body. Detection of the air bearing resonance modes is a more sensitive method for head-disc contact detection or detection of fly height instabilities.

Typically for an AlTiC slider body, vibration modes or structural modes have a characteristic frequency range of 0.80-4 MHz. For slider structural modes to get excited during head-disc contact events, the strain energy dissipated in such events must be high which generally requires high levels of interference between the head and the disc.

In contrast, the sensor element 160 or sensor of the present invention is configured to detect low frequency excitation of air bearing resonance modes. The low intensity contact events, which would not normally lead to excitation of the slider structural modes will cause air bearing (dynamic fly)

instabilities. Monitoring of air bearing mode excitation constitutes a more sensitive approach to head-disc contact or fly height instability detection.

FIG. 4-1 illustrates feedback 164 in 100-400 kHz range including air bearing resonance excitation 166 corresponding to non-contact instability. As shown, the excitation occurs at the same position for each revolution since the excitation is induced by an area or sector of microwaviness (e.g. sector 154). In FIG. 4-2, feedback 168 illustrates contact induced excitation 169 which in the illustrated example is provided via actuation of a head-media spacing actuator which is energized to adjust head media spacing.

The sensor element or sensor of the present invention detects air bearing resonant modes in a frequency range below 1.0 MHz or 0.8 MHz or below 500 kHz, and preferably in a frequency range of approximately 100 kHz to 400 kHz. The low frequency excitation of the slider or head assembly is detected using a sensor element having a relatively low resonant frequency or by configuring sensor circuitry (not shown in FIG. 4) to detect low frequency excitation of the sensor element 160.

Figure 5:
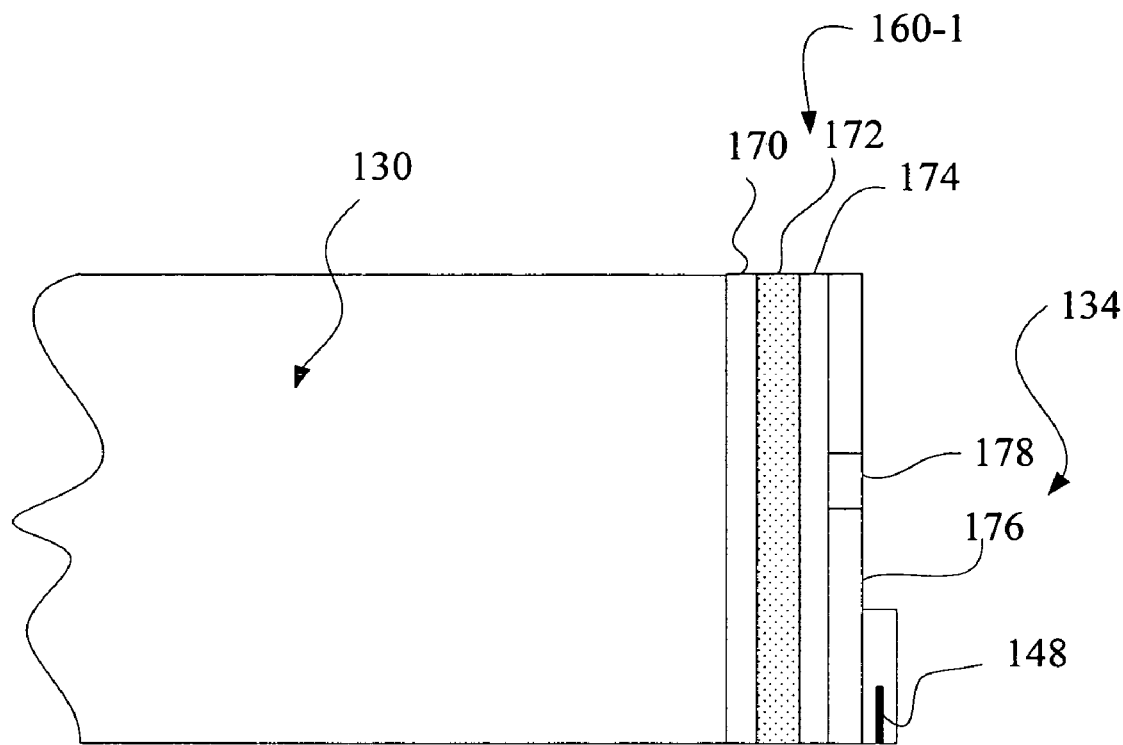
FIG. 5 schematically illustrates an embodiment of a head having a sensor element fabricated proximate to a trailing edge of the slider body.

FIG. 5 illustrates an embodiment of a head assembly including a sensor element 160-1 fabricated on the slider body 130 using known thin film deposition processes. Sensor element 160-1 is fabricated proximate to the trailing edge 134 of the slider body. The transducer element or elements 148 are fabricated adjacent the sensor element 160-1. In particular, as shown in the embodiment of FIG. 5, a first electrode 170 is fabricated or deposited on a slider substrate such an AlTiC substrate. A sensor layer 172 is fabricated adjacent to the first electrode 170 and a second electrode 174 is fabricated proximate to the sensor layer 172 to form the sensor element proximate to the trailing edge 134 of the slider body.

A base coat 176 is deposited over the sensor element 160-1 and the transducer element or elements 148 are fabricated over or proximate to the base coat 176 by known fabrication techniques. As described, the sensor element 160-1 is positioned proximate to the transducer element or elements 148 at the trailing edge 134 of the slider body to provide desired detection sensitivity for detecting non-contact induced instabilities, "onset of contact" or low level interference. In the embodiment shown, vias 178 for leads can be etched in the base coat 176 to provide an electrical connection to control or detection circuitry (not shown in FIG. 4).

In one embodiment, sensor layer 172 is formed of a piezoelectric material, ferroelectric material or material sensitive to acoustic emission. For example, suitable materials for the thin film sensor layer (shown in FIG. 5) include Lead-Zirconate Titanate ("PZT"), Aluminum Nitride (AlN) and Zinc Oxide (ZnO). Among these materials, AlN is particularly attractive because of its good affinity with AlTiC substrates of the slider body and its high piezoelectric coefficient.

Figure 6:
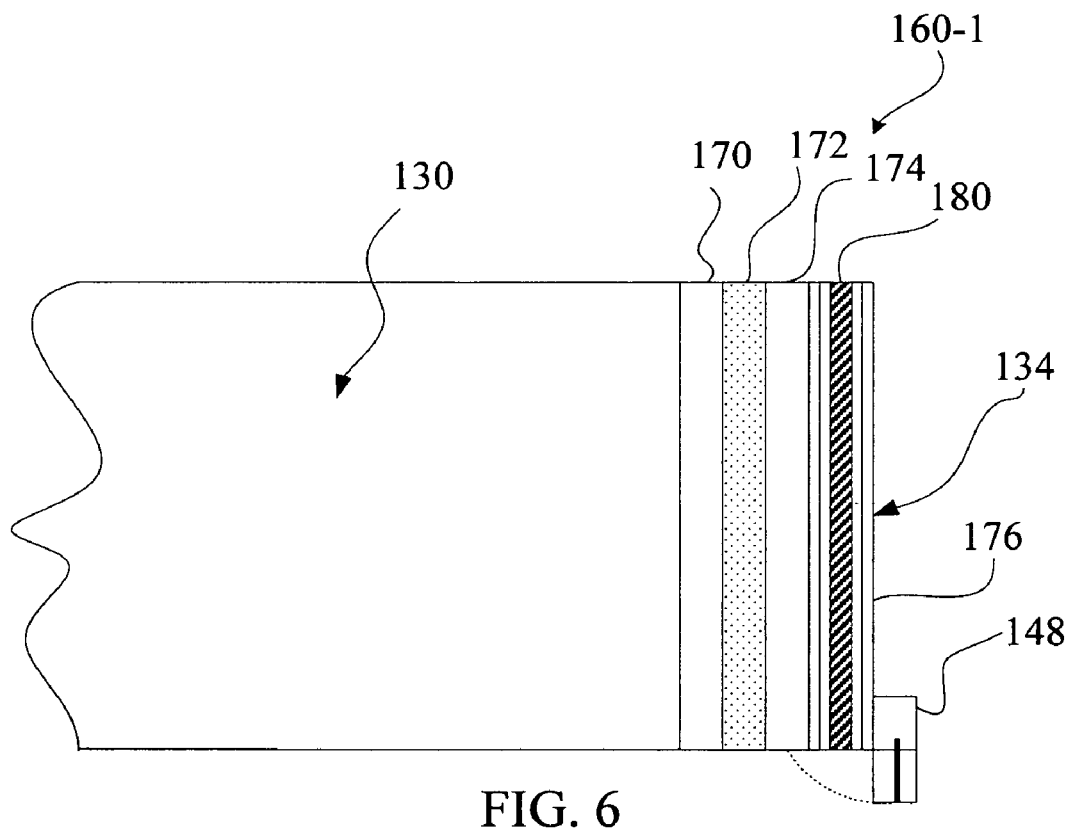
FIG. 6 schematically illustrates an embodiment of a head having a sensor element and heating element fabricated proximate to a trailing edge of the slider body.
Figure 7:
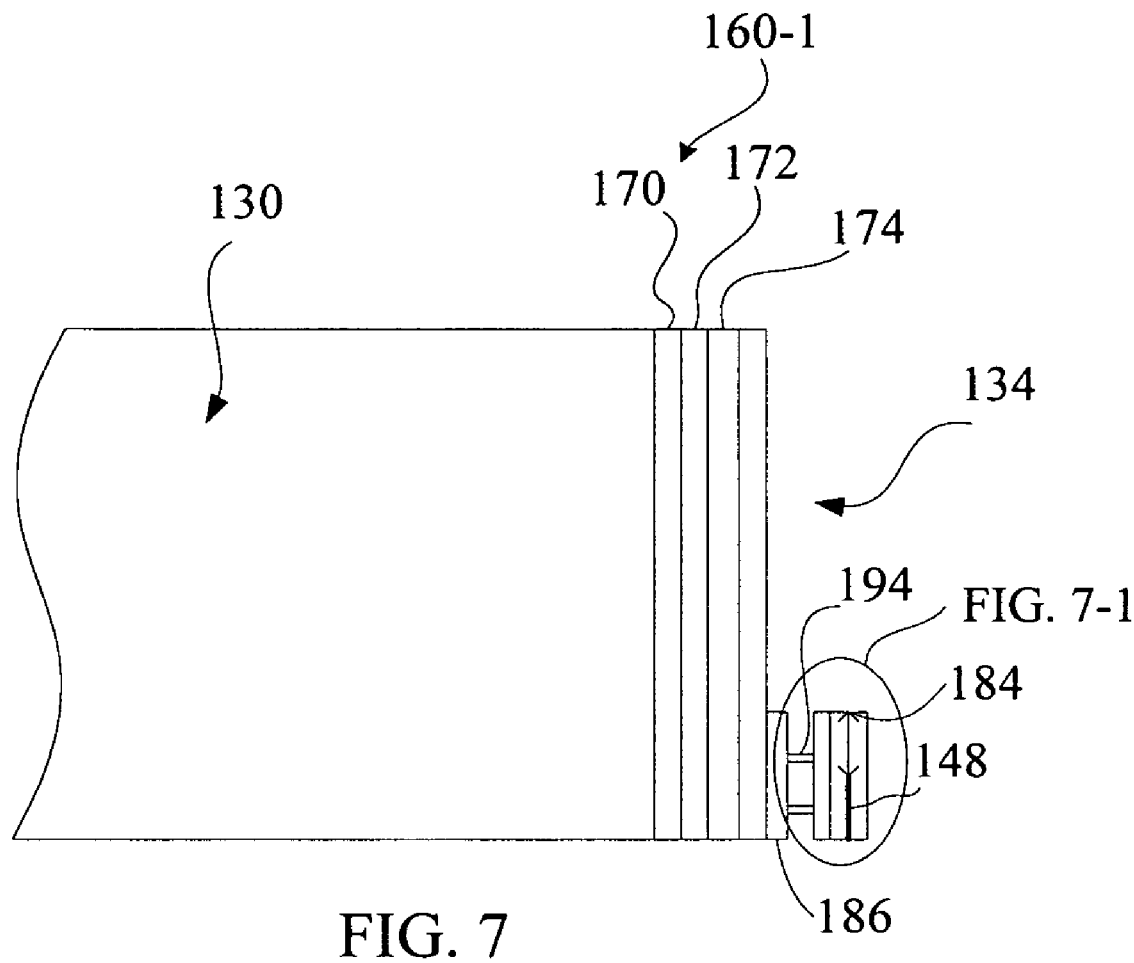
FIG. 7 schematically illustrates an embodiment of a head having a sensor element and electrostatic elements fabricated proximate to a trailing edge of the slider body.
Figures 1, 7:
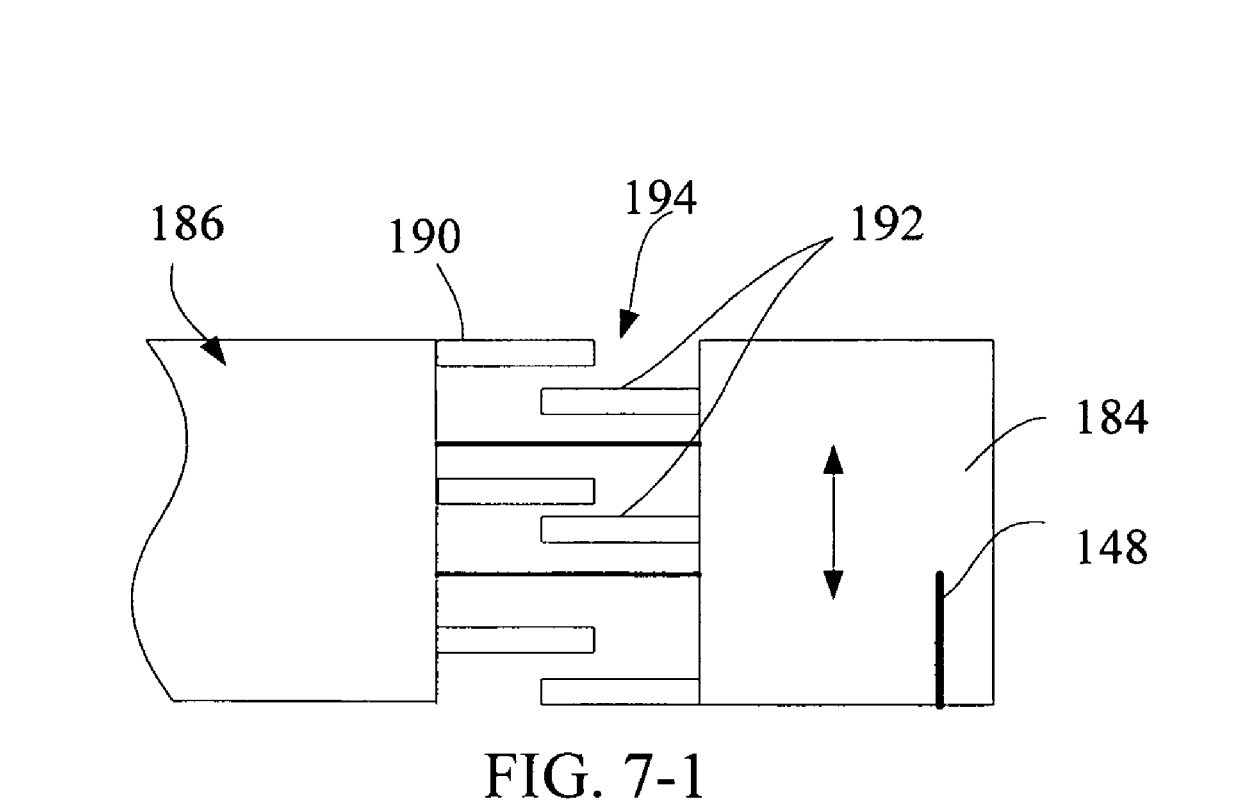
Figure 8:
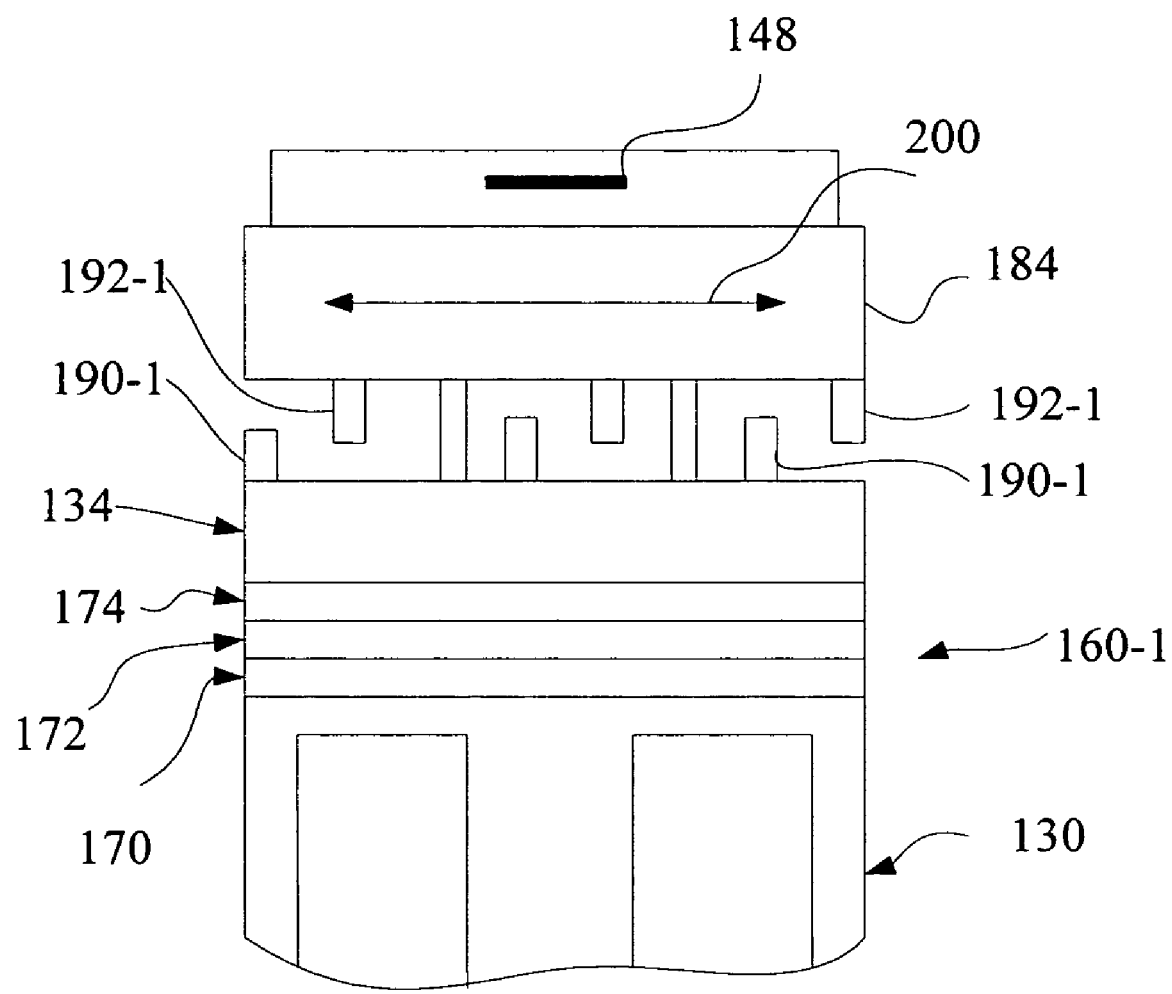
FIG. 8 schematically illustrates an embodiment of a head having a sensor element and electrostatic elements to form an off-track microactuator for track following.

FIGS. 6-8 illustrate various applications of a slider including a sensor to detect slider instabilities with a microactuator or microactuator element to microactuate the head. In the embodiment shown in FIG. 6, the head assembly includes a microactuator element 180 in combination with the sensor element 160-1 to adjust a position of the transducer element 148 or head media spacing on the head assembly. The microactuator element 180 is energized to actuate the head in addition to or in combination with the suspension level actuator or voice coil motor 114. In the embodiment shown, the sensor element 160-1 and the microactuator element 180 are fabricated on the slider body 130.

In the embodiment shown in FIG. 6, the microactuator element 180 is a thermal or heating element fabricated proximate to the trailing edge 134 of the slider body 130. The heating element is energized by supplying a voltage or current to the heating element to generate a localized thermally induced protrusion of the transducer elements 148 as illustrated in phantom in FIG. 6. The localized protrusion of the transducer portion of the slider body relative to an air bearing surface of the slider body compensates for head-media spacing fluctuations or slider instabilities.

The heating element is preferably formed of a resistive element or wire which is fabricated on the slider body using known thin film fabrication techniques. The heating or resistive element is embedded between insulating layers to protect the transducer elements 148. The size and shape of the heating element is designed to provide desired actuation stroke relative to available current or voltage supplied to energize the heating element.

In an alternate embodiment illustrated in FIGS. 7 and 7-1, the sensor element is fabricated on the head assembly in combination with an electrostatic element to form a microactuator to microposition the head or transducer elements 148. As shown in FIGS. 7 and 7-1, the transducer elements are fabricated on a floating transducer body 184 which is movably supported relative to a base portion 186 of the slider body. The floating transducer body 184 is actuated relative to the base portion 186 to adjust a reference or datum position of the transducer elements 148 relative to the slider body or base portion 186. The floating transducer body 184 is actuated via electrostatic combs 190, 192 fabricated in a gap 194 between the floating transducer body 184 and base portion 186.

As shown, the electrostatic combs 190, 192 includes a static electrode comb 190 on the slider body and a dynamic electrode comb 192 on the floating transducer body 184. The electrode combs 190, 192 include a plurality of interspersed electrode fingers which are energized to provide z-height actuation. In an alternate embodiment illustrated in FIG. 8, the combs 190-1, 190-2 on the slider body and the floating transducer body 184 are orientated to provide actuation in the off-track direction as illustrated by arrow 200. The floating transducer body and electrostatic combs are fabricated using micro-electro-mechanical (MEMS) fabrication techniques or processes.

Figure 9:
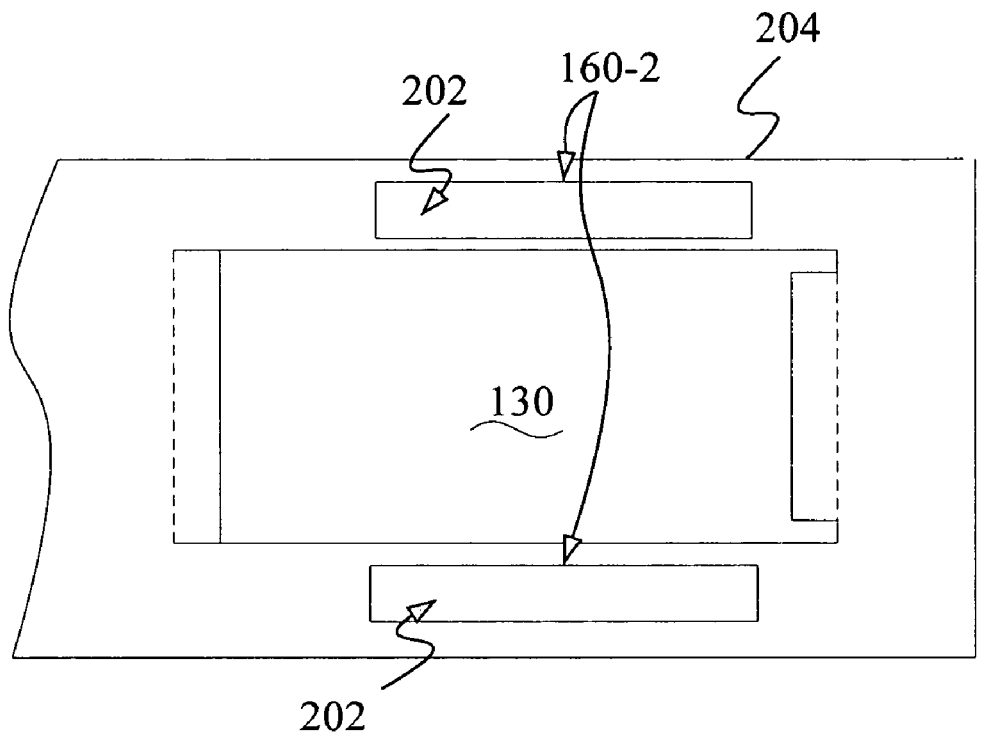
FIG. 9 schematically illustrates an embodiment of a head assembly including a piezoelectric or sensing element on gimbal arms to detect slider modulations.
Figures 1, 9:
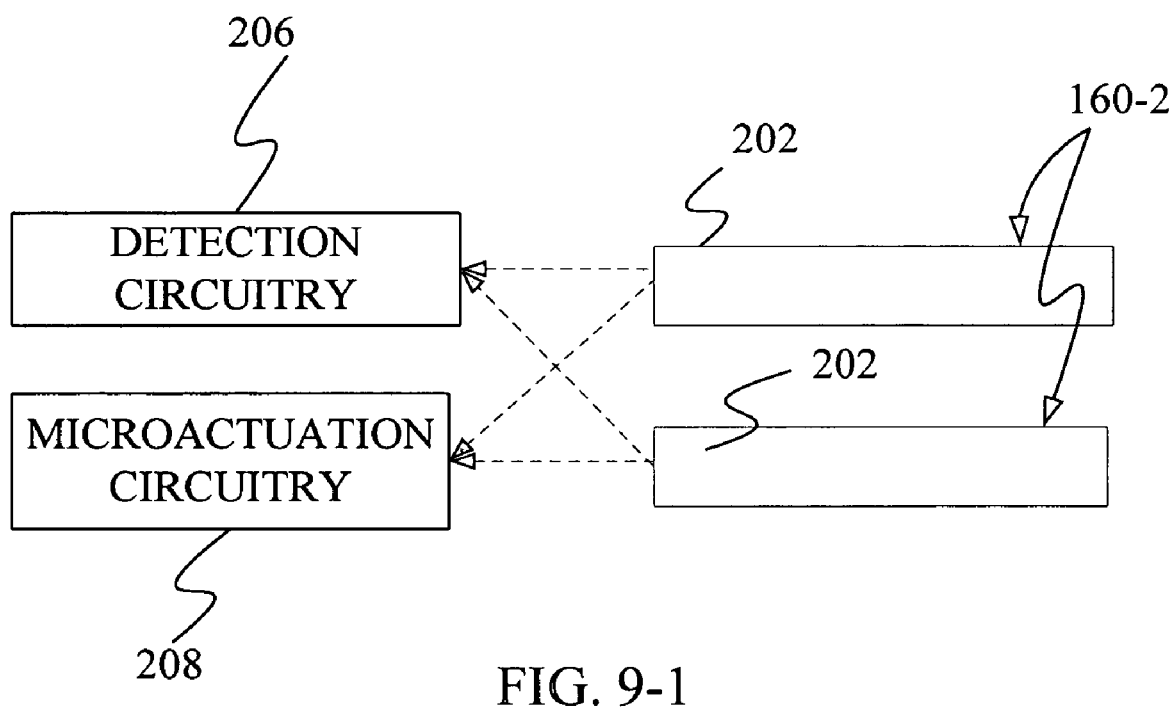

Alternatively as shown in FIG. 9, the sensor element(s) 160-2 are fabricated on a gimbal spring 204, gimbally connecting the slider body to the head suspension assembly 122. In the illustrated embodiment, the sensor element 160-2 includes a piezoelectric or ferroelectric body or element 202. As described, the sensor element 160-2 or piezoelectric element 202 is configured to detect low frequency excitation corresponding air bearing resonance modes as described.

In the embodiment illustrated in FIG. 9-1, detection circuitry 206 is coupled to the sensor or piezoelectric element(s) and receives a voltage signal from the sensor element(s) 160-2 corresponding to excitation of the sensor or piezoelectric element(s) indicative of non-contact instabilities or low level interference as described with respect to previous embodiments. Additionally, in the embodiment shown in FIG. 9-1, microactuation circuitry 208 is connected to the sensor element or piezoelectric element(s) to form a microactuator element to microactuate the head or transducer element(s) on the head assembly. Thus for operation, voice coil motor 114 is energized to position the head suspension assembly 122 and the microactuator is energized for fine head positioning of the head 102.

As described in FIG. 9-1, in a mapping or sensing mode, a voltage signal is detected by the detection circuitry 206 coupled the piezoelectric element 202, corresponding to excitation of the air bearing resonance modes of the head or slider body. In an actuating mode, a voltage signal is supplied to strain the piezoelectric elements 202 to microactuate the head as shown in FIG. 9-1. In alternate embodiments, detection circuitry and microactuation circuitry are coupled to separate sensor and actuator elements as illustrated in previous figures.

Figure 10:
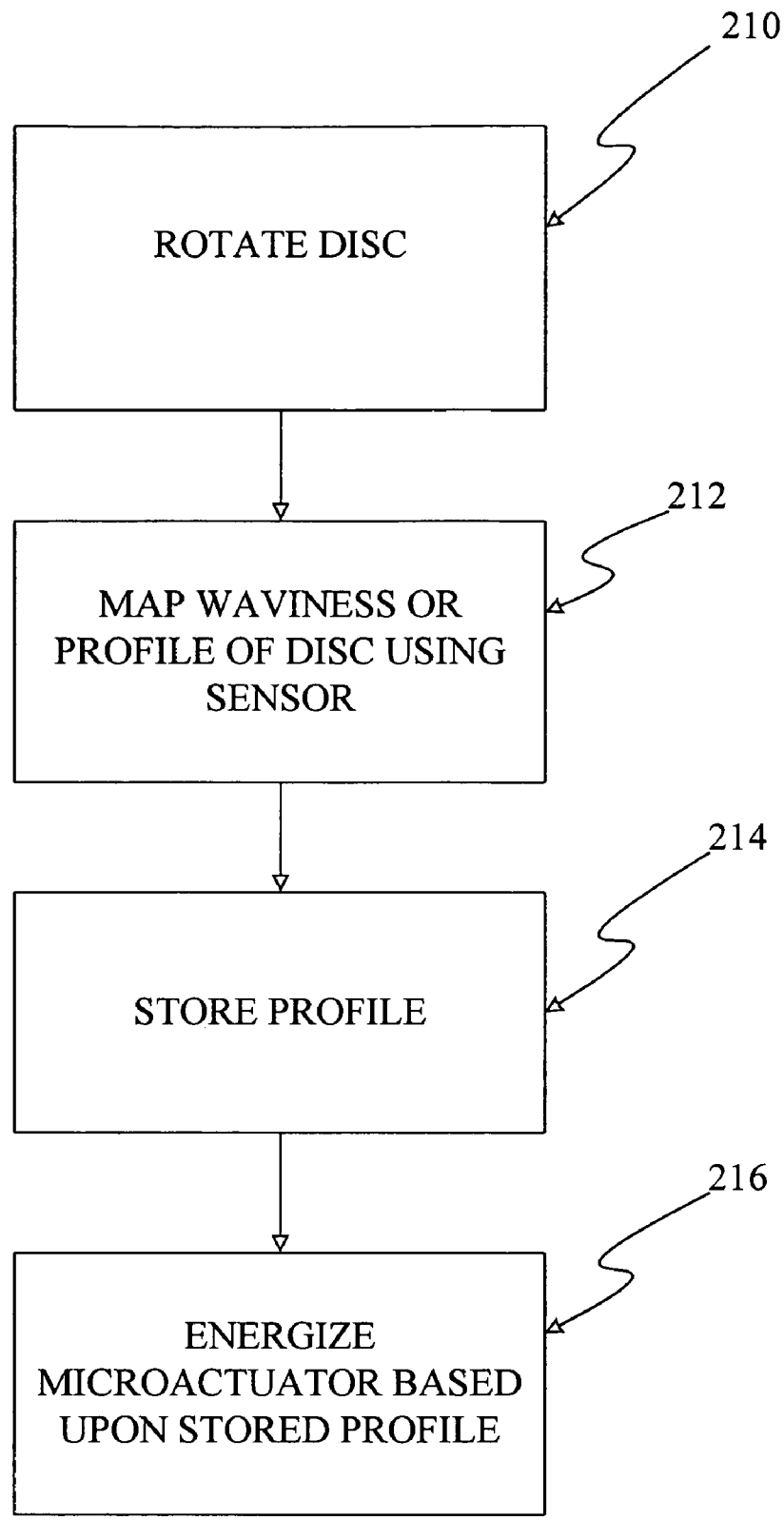
FIG. 10 is a block diagram illustrating an embodiment of the present invention to map or profile a disc surface using head-media feedback.

The sensor or sensor element(s) provide a way to detect one or more of non-contact instability, "onset" of contact and contact. This detection is provided by way of feedback. In an embodiment illustrated in FIG. 10, the feedback is used to map or profile the disc surface or head-media interface. As illustrated in FIG. 10, the disc is rotated 210 to pressurize the air bearing surface 136 of the sensor head. The head is positioned relative to data tracks on the disc surface via a voice coil motor or actuator assembly to map the disc surface 212. Feedback from a sensor element on the head is used to map or profile the disc surface. The profile or sensor feedback can be stored in system memory 214.

In the embodiment illustrated in FIG. 10, the sensor feedback is used to energize a microactuator 216, for example, to compensate for variations in the media surface topography. Application of the microactuator to compensate for head media interface variations or instability provides tight tolerance control of the fly height and head-media spacing for read and/or write resolution and clarity.

Figure 11:
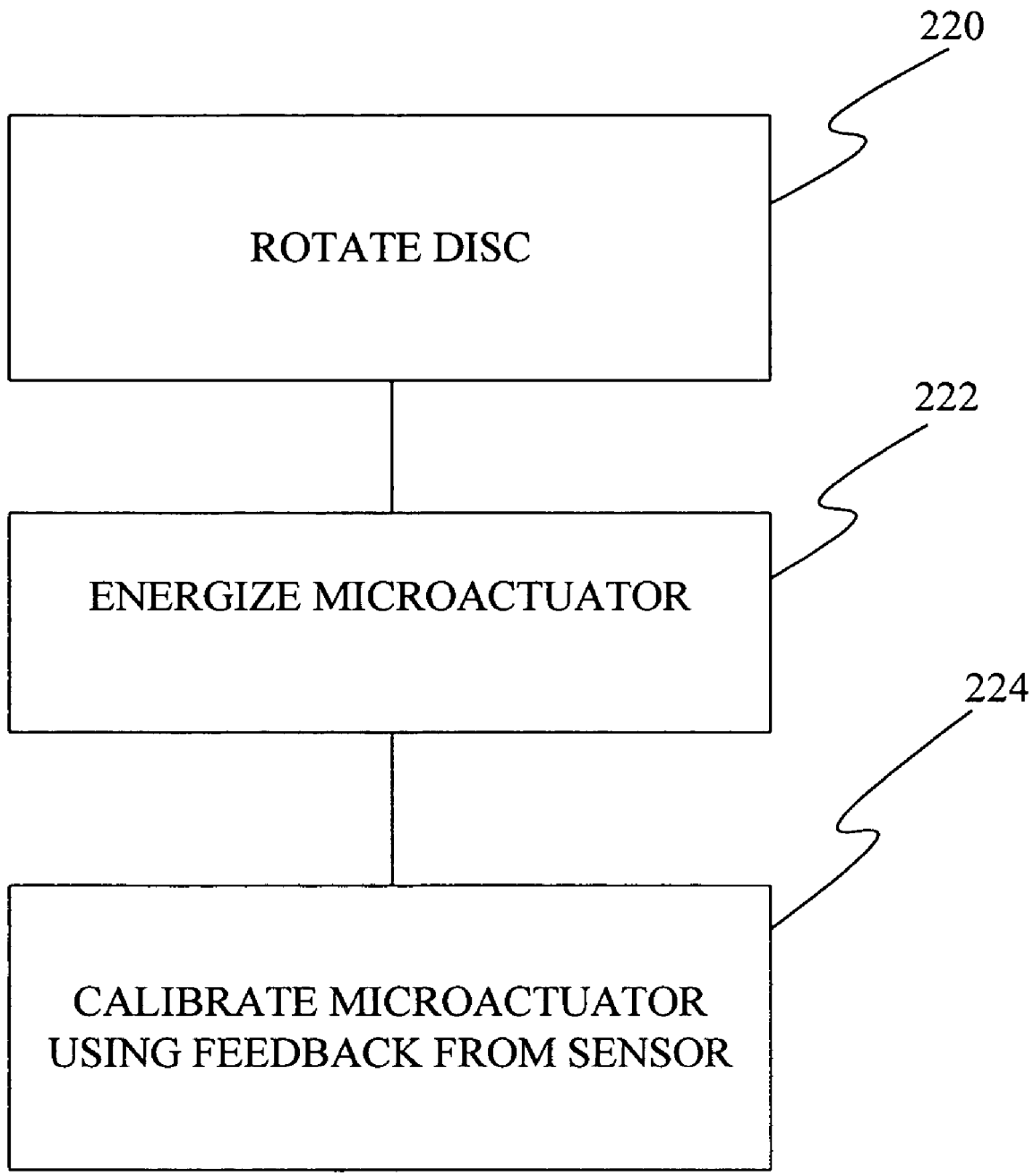
FIG. 11 is a block diagram illustrating an embodiment of the present invention to calibrate or determine parameters or limits of a microactuator.

In another embodiment, illustrated in FIG. 11, a sensor element is used to calibrate or determine operational limits of a microactuator on the sensor head. For example, for calibration, the disc is rotated 220 to pressurize the air bearing surface on the head. Next, the microactuator element is energized 222 at different voltage levels or amplitudes and the sensor element provides acoustic feedback to calibrate parameters or operational limits of the microactuator for different energization levels or voltages 224.

Feedback from the sensor element is used to optimize microactuator stroke or parameters such as, maximum pole tip protrusion for a dedicated micro-heater element. Because the area of contact of the protruding pole is very small or because the contact is localized, the physical interaction is low energy and the interference between the head and disc is small. As described, the sensor of the present invention detects the low levels of physical interference in contrast to high energy contact interaction that would be required to excite slider structural modes.

The sensor described provides advantages over prior sensors which require high level contact interference. High contact interference could damage the head as a result of exposure to high interfacial thermo-mechanical stress, and/or due to accelerated burnishing or wear of the head and/or media protective overcoats which would compromise the resistance of the head or media to corrosion. The sensor of the present invention is used to detect contact or "onset of contact" between the head and disc to calibrate the microactuator without compromising the near- and/or long-term reliability of the head, disc or both.

Intermittent or cyclical energization of a microactuator element such as a heating element illustrated in FIG. 6 can damage or crack the substrate or thin film layers of the head. For instance, if a dedicated micro-heater element is used to attain superior data writing performance via thermally-induced protrusion of the write pole or transducer elements, then use parameters such as maximum heater power or, equivalently, maximum write pole protrusion, would have to be set so that the risk for heater and/or head failures due to, for example, electromigration, and thermal and/or mechanical fatigue is minimized or eliminated. Having the ability to detect and characterize such types of failures at the spinstand level (prior to assembly in a disc drive) or drive level (after the head is assembled in a disc drive) provides benefits in the design optimization of proximity or near-contact heads.

Figure 12:
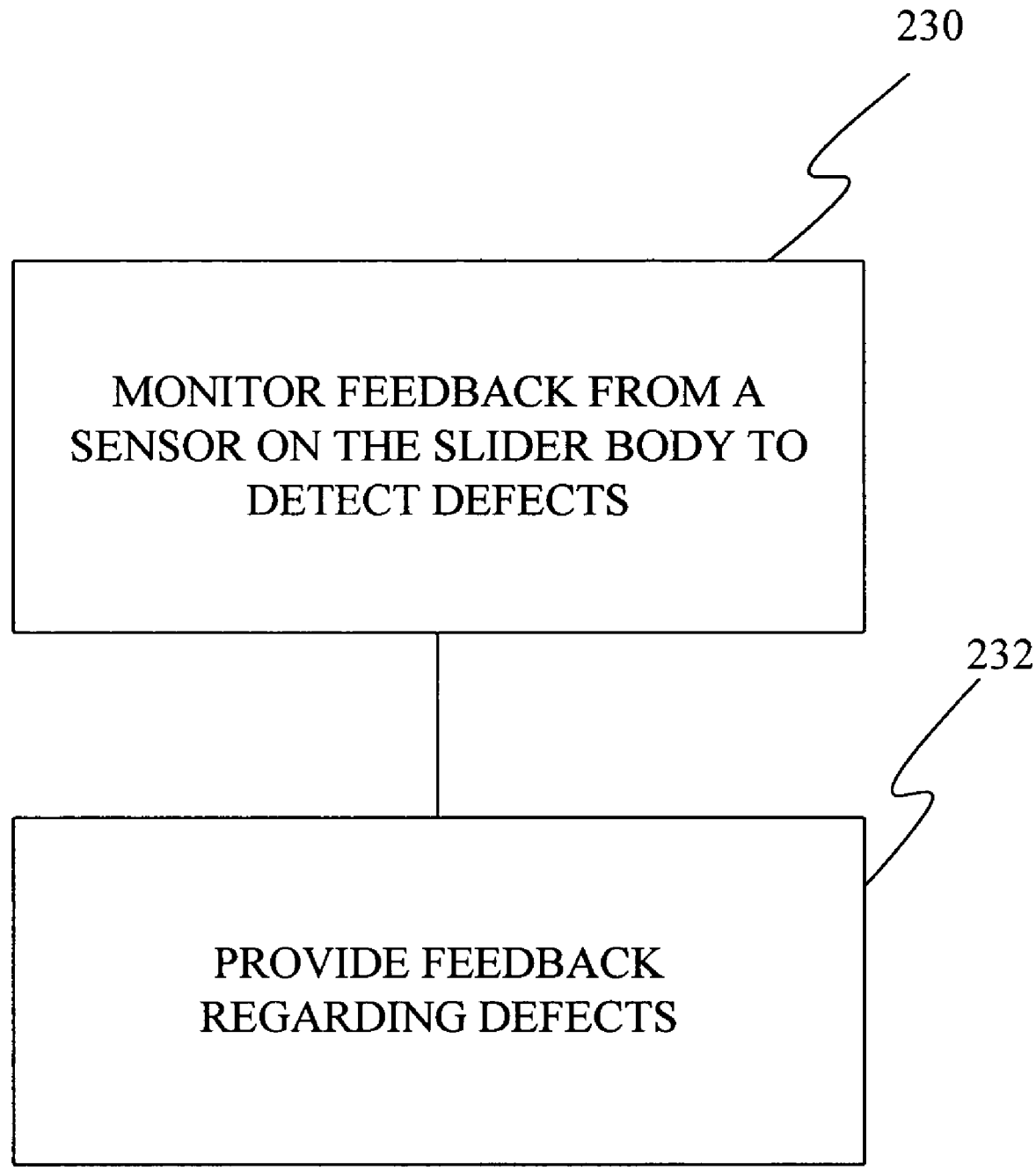
FIG. 12 is a block diagram illustrating an embodiment of the present invention to detect defects in the head, transducer elements or thin film structure.

In the embodiment illustrated in FIG. 12, a sensor element is configured to detect acoustic emission transmitted from a crack or defect in the head to monitor or detect damage to the head or thin film layers of the head. For example, strain energy or heat is released or propagates from the cracks or defect. As shown in FIG. 12, feedback from the sensor element on the head is monitored by a monitoring circuit to detect defects 230 to provide feedback regarding defects 232. In particular, the dissipated strain energy or stress waves excite the sensor element. Excitation of the sensor element is monitored to detect defects or cracks in the head or thin film layers of the head.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. For example, the sensor and microactuator elements can be formed of various materials or structures that produce an electrical signal in response to excitation and which produce a strain in response to an input current or voltage signal. In addition, although the preferred embodiment described herein is directed to magnetic recording devices having a particular air bearing surface, it will be appreciated by those skilled in the art that the teachings of the present invention can be applied to optical systems and other air bearing designs, without departing from the scope and spirit of the present invention.

What is claimed is:

1. A head assembly comprising:
   a slider body including a leading edge and a trailing edge;
   at least one transducer element along the trailing edge of the slider body;
   a sensor element fabricated along a trailing edge portion of the slider body configured to detect low frequency excitation of the slider body in a frequency range of approximately less than about 1.0 MHz and the sensor element being positioned closer to the leading edge of the slider body than the at least one transducer element; and
   a microactuator between the sensor element and the at least one transducer element and configured to adjust the at least one transducer element in a z-height direction.

2. The head assembly of claim 1 wherein the sensor element is formed of a piezoelectric material.

3. The head assembly of claim 1 wherein the sensor element is configured to detect low frequency excitation of the slider body in a frequency range of approximately less than 500 KHz.

4. The head assembly of claim 1 wherein the sensor element is configured to detect low frequency excitation of the slider body in a frequency range of approximately 100 KHz-400 KHz.

5. The head assembly of claim 1 wherein the sensor element includes a piezoelectric or ferroelectric material.

6. The head assembly of claim 1 wherein the microactuator is an electrostatic actuator.

7. A head assembly comprising:
   a slider body including a leading edge and a trailing edge;

at least one transducer element fabricated along the trailing edge;

a sensor element spaced from the at least one transducer element wherein the sensor element includes a first electrode layer and a second electrode layer and an intermediate piezoelectric sensor layer between the first and second electrode layers; and a microactuator separate from the sensor element and configured to adjust a position of the at least one transducer element without adjusting a position of the sensor element relative to the slider body.

8. The head assembly of claim 7 wherein the sensor element is configured to detect an excitation frequency of approximately less than 0.8 MHz.

9. The head assembly of claim 7 wherein the sensor element is configured to detect an excitation frequency in a frequency range of approximately 100 kHz to 400 kHz.

10. The head assembly of claim 7 wherein the sensor element is fabricated along the trailing edge portion of the slider body using a thin film deposition.

11. The head assembly of claim 7 wherein the microactuator is configured to adjust a position of the at least one transducer element in one of a z-height direction or off-track direction.

12. The head assembly of claim 7 wherein the microactuator is configured to adjust a position of the at least one transducer element in a z-height direction.

13. The head assembly of claim 7 wherein the microactuator is energized using a stored profile from the sensor element.

14. The head assembly of claim 7 wherein the sensor element is configured to detect onset of contact or non-contact induced instabilities of the slider body.

15. A method using the head assembly of claim 14 and comprising energizing the microactuator and using the sensor element to detect instability of the slider body to calibrate operational limits or parameters of the microactuator.

16. The method of claim 15 comprising utilizing the sensor element to detect defects or cracks in the head assembly.

17. The head assembly of claim 7 and comprising a base layer or portion separating the sensor element from the microactuator.

* * * * *